United States Patent
Kim et al.

(10) Patent No.: US 12,071,055 B2
(45) Date of Patent: Aug. 27, 2024

(54) HEADREST OF VEHICLE

(71) Applicants: Hyundai Motor Company, Seoul (KR); Kia Corporation, Seoul (KR); SEOYONCNF, Ulsan (KR)

(72) Inventors: Sang Ho Kim, Incheon (KR); Tae Jo Kim, Ulsan (KR); Seon Chae Na, Gyeonggi-do (KR); Yong Jun Shin, Ulsan (KR)

(73) Assignees: Hyundai Motor Company, Seoul (KR); Kia Corporation, Seoul (KR); SEOYONCNF, Ulsan (KR)

( * ) Notice: Subject to any disclaimer, the term of this patent is extended or adjusted under 35 U.S.C. 154(b) by 30 days.

(21) Appl. No.: 17/872,323

(22) Filed: Jul. 25, 2022

(65) Prior Publication Data

US 2023/0202369 A1   Jun. 29, 2023

(30) Foreign Application Priority Data

Dec. 24, 2021   (KR) .................. 10-2021-0187209

(51) Int. Cl.
*B60N 2/865*   (2018.01)
*B60N 2/885*   (2018.01)

(52) U.S. Cl.
CPC ............ *B60N 2/865* (2018.02); *B60N 2/885* (2018.02)

(58) Field of Classification Search
CPC .... B60N 2/865; B60N 2/885; B60N 2/02253; B60N 2/02246
See application file for complete search history.

(56) References Cited

U.S. PATENT DOCUMENTS

| | | | | |
|---|---|---|---|---|
| 2010/0283306 | A1* | 11/2010 | Boes ...................... | B60N 2/885 297/408 |
| 2017/0341547 | A1* | 11/2017 | Tatewaki ............... | B60N 2/865 |
| 2018/0251055 | A1* | 9/2018 | Hayashi ................. | B60N 2/885 |
| 2018/0334061 | A1* | 11/2018 | Fredriksson ........... | B60N 2/865 |
| 2019/0210501 | A1* | 7/2019 | Kapusky ................ | B60N 2/824 |
| 2019/0241107 | A1* | 8/2019 | Jeong ..................... | B60N 2/806 |

FOREIGN PATENT DOCUMENTS

| | | | | |
|---|---|---|---|---|
| EP | 3492310 | A1 * | 6/2019 | ............... B60N 2/02 |
| JP | 2005-066092 | A | 3/2005 | |
| KR | 10-0699053 | B1 | 3/2007 | |
| KR | 10-2015-0077502 | A | 7/2015 | |

OTHER PUBLICATIONS

Woobo Tech Co, Apparatus for forward and backward movement of car headrests, Mar. 2007, KR-10-699053-B1, entire translation (Year: 2007).*

* cited by examiner

*Primary Examiner* — David R Dunn
*Assistant Examiner* — Tania Abraham
(74) *Attorney, Agent, or Firm* — Fox Rothschild LLP (57) ABSTRACT

A wing-out headrest for a vehicle is disclosed. The headrest for a vehicle includes: a main frame mounted on a stay; a first frame assembly mounted on the main frame to reciprocate in a back and forth direction of the vehicle; a second frame assembly mounted on the main frame to reciprocate in a back and forth direction of the vehicle; and a wing-out frame mounted on the second frame assembly, and including a center frame and a pair of first and second lateral frames rotatably mounted on respective sides of the center frame, wherein the second frame assembly and the wing-out frame may move back and forth as the first frame assembly moves, and the one pair of lateral frames of the wing-out frame may be rotated as the second frame assembly moves.

12 Claims, 13 Drawing Sheets

Before wing-out operation

After wing-out operation

HEADREST OF VEHICLE

CROSS-REFERENCE TO RELATED APPLICATION

This application is based on and claims under 35 U.S.C. § 119(a) the benefit of Korean Patent Application No. 10-2021-0187209 filed in the Korean Intellectual Property Office on Dec. 24, 2021, the entire contents of which are incorporated herein by reference.

TECHNICAL FIELD

Embodiments of the present disclosure relates to a wing-out headrest for a vehicle. More particularly, embodiments of the present disclosure relate to a wing-out headrest for a vehicle for folding respective sides of a headrest inward.

DESCRIPTION OF THE RELATED ART

Seats for passengers to sit on are installed in a vehicle, and headrests for stably supporting necks and heads of the passengers and thereby providing comfortable rides are mounted in the vehicle.

Recently, to improve the comfortable rides of the passengers, wing-out headrests in each of which respective sides of the headrest are folded inward are mounted in the vehicles.

Conventional wing-out headrests support the necks and the heads of the passengers when the passengers grip the respective sides of the headrest and apply a force in a direction in which the respective sides of the headrest face each other.

To realize the wing-out headrest, the passengers have to hold respective frames of the wing-out headrest with their hands and apply a big force (e.g., 7 to 8 kgf) and women or children have difficulty in using them.

Further, supporting forces of the respective sides of the headrest are weak, so when the passengers lean their heads on the headrest, the respective frames of the headrest easily return to their original position.

To solve this problem, a torque hinge structure is used to reduce an actuation force for changing the respective frames of the wing-out headrest and increase the supporting force for supporting the heads of the passengers.

However, the torque hinge for realizing a small actuation force and a supporting force has a complicated structure and requires a high manufacturing cost.

SUMMARY

Embodiments of the present disclosure have been made in an effort to provide a headrest (including wing-out headrest) for a vehicle for reducing an actuation force for changing frames on respective sides of headrest (including wing-out headrest) and increasing a supporting force for supporting a head of a passenger.

An exemplary embodiment of the present disclosure provides a headrest for a vehicle including: a main frame mounted on a stay; a first frame assembly mounted on the main frame and configured or arranged to reciprocate in a back and forth direction of the vehicle; a second frame assembly mounted on the main frame and configured or arranged to reciprocate in a back and forth direction of the vehicle; and a frame mounted on the second frame assembly, and including a center frame and a pair of first and second lateral frames rotatably mounted on respective sides of the center frame, wherein the second frame assembly and the wing-out frame are preferably configured or arranged move back and forth as the first frame assembly moves, and the one pair of lateral frames of the frame preferably may be rotated as the second frame assembly moves.

In preferred aspects, the frame may have a wing-out configuration, i.e. a wing-out frame.

The first frame assembly may include: a first frame mounted on the main frame in a moveable way; a first nut plate for converting a rotation motion of a first motor assembly mounted on the main frame and generating power into a straight-line motion, the first nut plate being installed in the first frame; and at least one first guide pin formed in the first frame.

A first guide hole inserted in the first guide pin may be formed in the main frame.

The first motor assembly may include: a first motor for generating power; a first worm gear combined to a rotation shaft of the first motor; and a first rotation gear including a first end on which a first worm wheel gear-engaged to the first worm gear is formed and a second end on which a first lead screw is formed.

The first lead screw of the first rotation gear may be gear-engaged to a first nut groove formed on the first nut plate.

The second frame assembly may include: a second frame mounted on the first frame in a moveable way; a second nut plate converting a rotation motion of a second motor assembly mounted on the second frame and generating power into a straight-line motion, the second nut plate being installed in the second frame; and at least one second guide pin formed in the second frame.

A second guide hole into which the second guide pin is moveably inserted may be formed in the first frame assembly.

The second motor assembly may include: a second motor for generating power; a second worm gear combined to a rotation shaft of the second motor; and a second rotation gear including a first end on which a second worm wheel gear-engaged to the second worm gear is formed and a second end on which a second lead screw is formed.

The second lead screw of the second rotation gear may be gear-engaged to a second nut groove formed on the second nut plate.

First and second links may be rotatably connected between the second frame and the first lateral frame and between the second frame and the second lateral frame.

The one pair of lateral frames may be hinge-combined to the center frame so that they are rotated in a direction in which they face each other.

When the second frame assembly moves forward, the first lateral frame and the second lateral frame may be rotated in a direction in which they face each other by the first and second links, and when the second frame assembly moves backward, the first lateral frame and the second lateral frame may be rotated in a direction in which they become distant from each other by the first and second links.

The second frame assembly may move for an entire section in which the first frame assembly moves, and first and second lateral frames of the wing-out frame may be rotated for an entire section in which the second frame assembly moves.

According to the wing-out headrest for a vehicle according to an exemplary embodiment of the present disclosure, the sliding operation and the wing-out operation of the wing-out frame are electrically simultaneously realized so convenience of the user and the commercial value of the vehicle may be increased.

In another embodiment, vehicles are provided that comprise an apparatus as disclosed herein.

BRIEF DESCRIPTION OF THE DRAWINGS

These drawings are for reference only in describing exemplary embodiments of the present disclosure, and therefore, the technical idea of the present disclosure should not be limited to the accompanying drawings.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

To clearly describe the present disclosure, portions which do not relate to the description are omitted, and like reference numerals designate like elements throughout the specification.

The size and thickness of each configuration shown in the drawings are arbitrarily shown for better understanding and ease of description, but the present disclosure is not limited thereto, and the thicknesses are enlarged for clarifying many layers and areas.

A wing-out headrest for a vehicle according to an exemplary embodiment of the present disclosure will now be described with reference to accompanying drawings.

Figure 1:
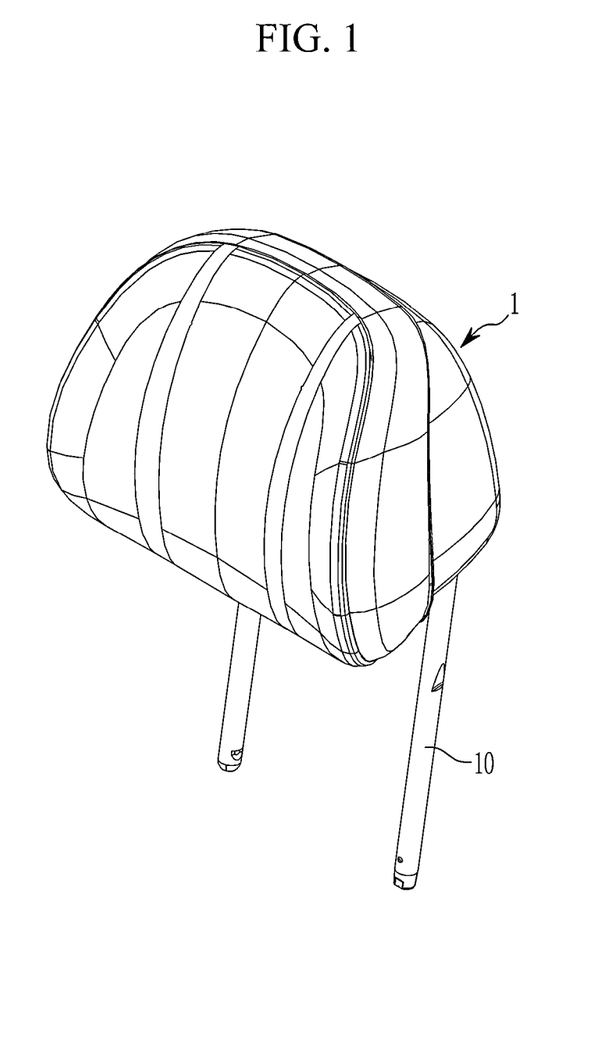
FIG. 1 shows a perspective view of a configuration of a wing-out headrest for a vehicle according to an exemplary embodiment of the present disclosure.
Figure 2:
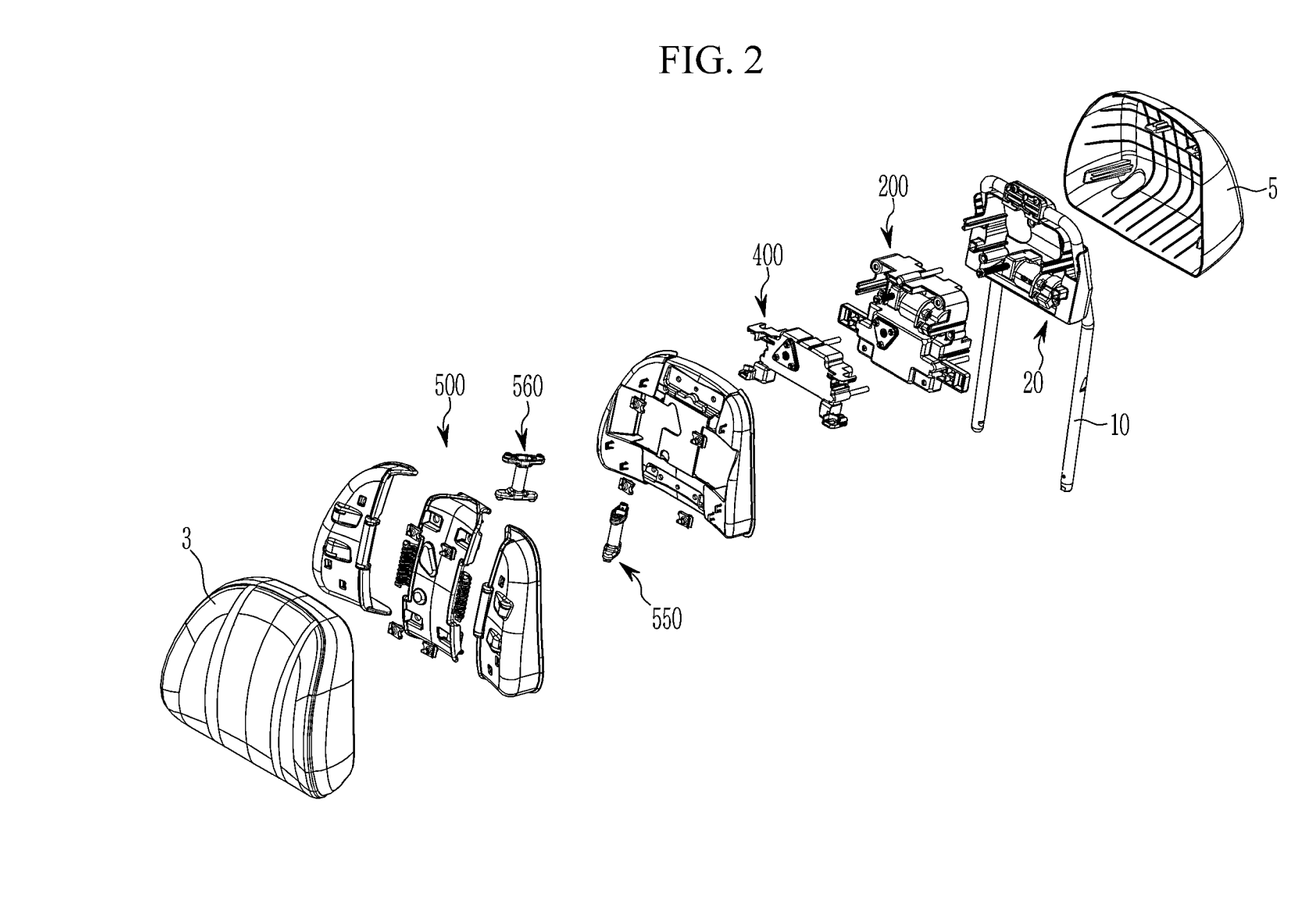
FIG. 2 shows an exploded perspective view of a configuration of a wing-out headrest for a vehicle according to an exemplary embodiment of the present disclosure.
Figure 3:
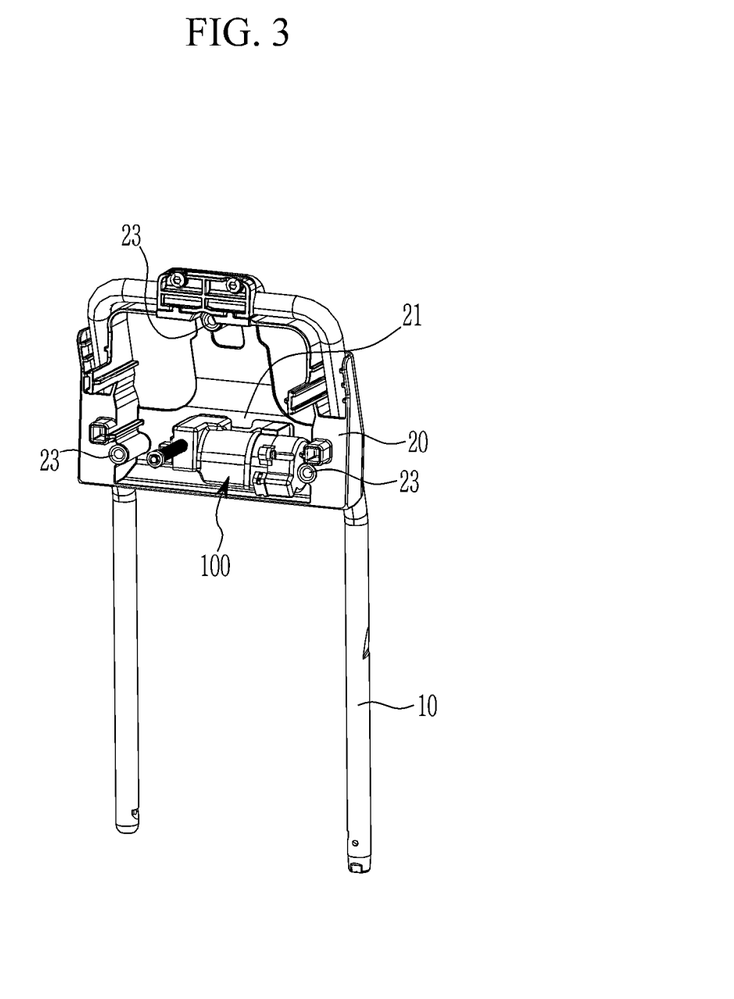
FIG. 3 shows a perspective view of a partial configuration of a wing-out headrest for a vehicle according to an exemplary embodiment of the present disclosure.
Figure 4:
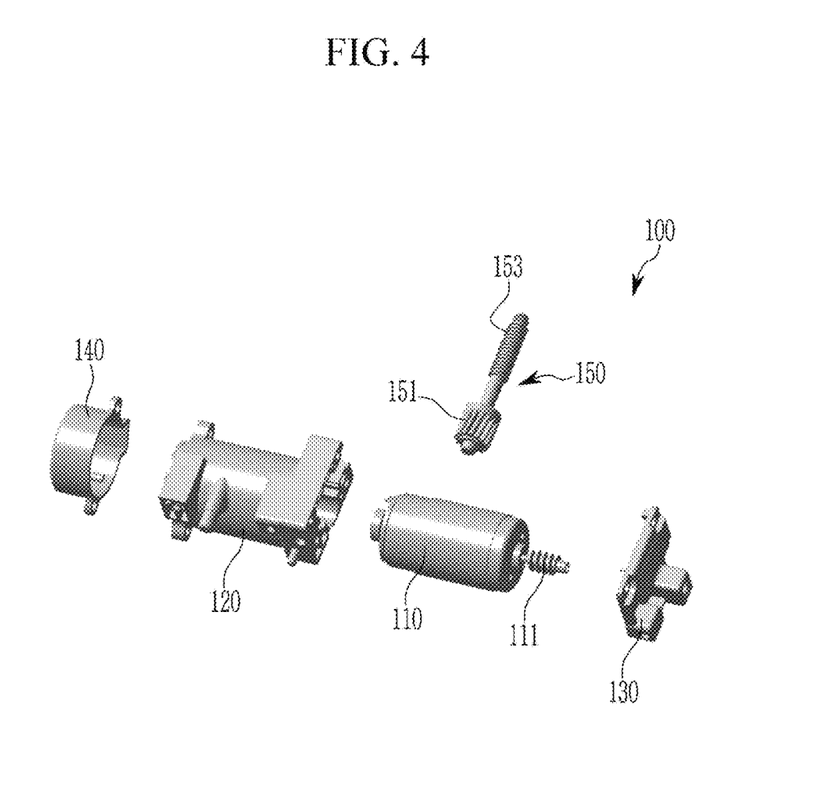
FIG. 4 shows an exploded perspective view of a configuration of a first motor assembly according to an exemplary embodiment of the present disclosure.

FIG. 1 and FIG. 2 show perspective views of a configuration of a wing-out headrest for a vehicle according to an exemplary embodiment of the present disclosure. FIG. 3 and FIG. 4 show exploded perspective views of a configuration of a wing-out headrest for a vehicle according to an exemplary embodiment of the present disclosure.

As shown in FIG. 1 and FIG. 2, the wing-out headrest 1 for a vehicle may include a main frame 20, a first frame assembly 200, a second frame assembly 400, and a wing-out frame 500.

The main frame 20 may be installed in a stay 10, and the first frame assembly 200 may be installed in the main frame 20 so that it may move backward and forward. The second frame assembly 400 may be installed in the first frame assembly 200 so that it may be moveable in a back and forth direction. The wing-out frame 500 may be installed in the second frame assembly 400.

A front cover 3 may be engaged to a front side of the wing-out frame 500, and a rear cover 5 may be engaged to a rear side of the main frame 20. The front cover 3 may support a head part of a passenger.

FIG. 3 shows a perspective view of a partial configuration of a wing-out headrest for a vehicle according to an exemplary embodiment of the present disclosure. FIG. 3 shows a stay 10 and a main frame 20 of a wing-out headrest according to an exemplary embodiment of the present disclosure.

Referring to FIG. 3, the main frame 20 may be installed in the stay 10 mounted to be moveable in a perpendicular direction on a sheet of a vehicle. The stay 10 substantially may have a U shape, and the main frame 20 is mounted between the stay 10.

A first motor seating groove 21 may be formed in a lower center of the main frame 20. A first motor assembly 100 may be disposed in the first motor seating groove 21.

At least one first guide hole 23 may be formed in the main frame 20. Multiple first guide holes 23 may be formed depending on needs. For example, the first guide hole 23 may be respectively formed in an upper center, a lower left, and a lower right of the main frame 20. A first guide pin 213 of a first frame 210 to be described may be inserted in the first guide hole 23 in a moveable way.

FIG. 4 shows an exploded perspective view of a configuration of a first motor assembly according to an exemplary embodiment of the present disclosure.

Referring to FIG. 4, the first motor assembly 100 may include a first motor 110, a first motor housing 120, a first motor front cover 130, a first motor rear cover 140, and a first rotation gear 150.

The first motor 110 may generate power by electrical energy, and a first worm gear 111 may be combined to a rotation shaft of the first motor 110.

A first worm wheel 151 may be formed on a first end of the first rotation gear 150, and a first lead screw 153 may be formed on a second end of the first rotation gear 150.

The first worm wheel 151 of the first rotation gear 150 may be gear-engaged to the first worm gear 111 combined to the rotation shaft of the first motor 110. Torque of the first motor 110 may be switched to a perpendicular direction by the first worm gear 111 and the first worm wheel 151. The first worm gear 111 may be gear-engaged to the first worm wheel 151 so a self-locking function in which the first frame 210 is not moved by an external force when the first motor 110 is not operated may be realized. The first lead screw 153 may be gear-engaged to a first nut plate 220 of a first frame 210 to be described.

The first motor 110 may be installed in the first motor housing 120, the first motor front cover 130 may be combined to a front side of the first motor 110, and first motor rear cover 140 is combined to a rear side of the first motor 110. While the first motor 110, the first motor housing 120, the first motor front cover 130, and the first motor rear cover 140 are combined, the first motor assembly 100 may be assembled in the first motor seating groove 21 of the main frame 20.

Figure 5:
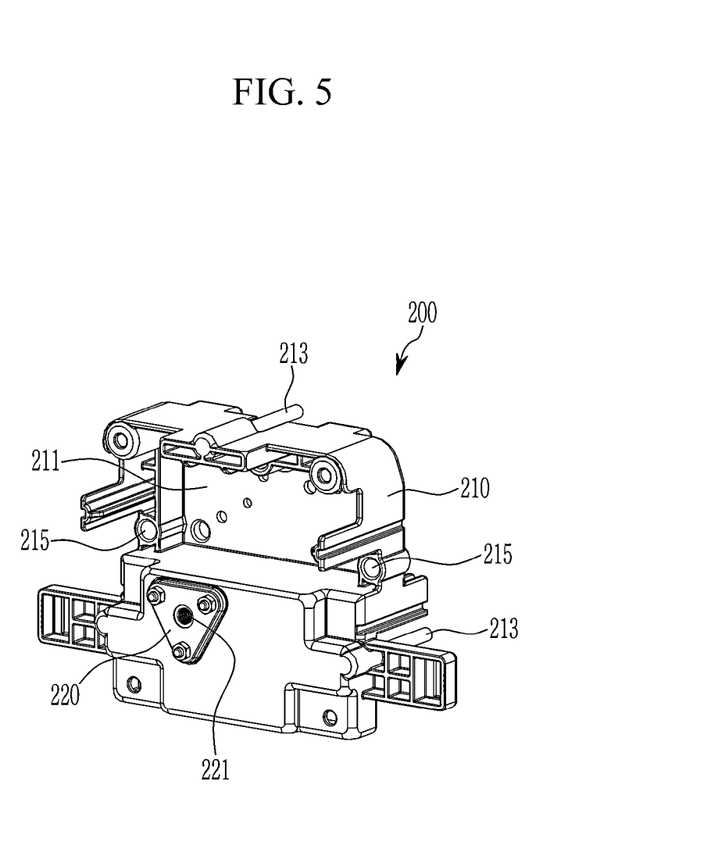
FIG. 5 shows a perspective view of a configuration of a first frame assembly according to an exemplary embodiment of the present disclosure.

FIG. 5 shows a perspective view of a configuration of a first frame assembly according to an exemplary embodiment of the present disclosure.

Referring to FIG. 5, the first frame assembly 200 may include a first frame 210, a first nut plate 220, and a first guide pin 213.

The first frame 210 may be mounted in the main frame 20 to be moveable in the back and forth direction. A second motor seating groove 211 for receiving a second motor assembly 300 to be described may be formed in the first frame 210. The first motor seating groove 21 may be formed at an upper portion of the first frame 210.

The first nut plate 220 may convert a rotation motion of the first motor 110 of the first motor assembly 100 into a straight-line motion. For this purpose, a first nut groove 221 formed in the first nut plate 220 may be gear-engaged to the first lead screw 153 of the first rotation gear 150.

Hence, when the first motor 110 is operated, the torque generated on the first motor 110 by the first worm gear 111 and the first worm wheel 151 may be switched to be perpendicular to the rotation shaft of the first motor 110. The rotation motion of the first motor 110 may be switched to the straight-line motion by the first lead screw 153 and the first nut plate 220. The first frame assembly 200 accordingly may move in the back and forth direction by an operation of the first motor 110. When needed, the first nut plate 220 may be integrally formed with the first frame 210.

At least one first guide pin 213 may be formed in the first frame 210, and multiple first guide pins 213 may be formed if needed. The first guide pin 213 may extend in a direction that goes toward the main frame 20. The first guide pin 213 may be formed on a position that corresponds to the first guide hole 23 formed in the main frame 20. The first guide pin 213 of the first frame 210 may be inserted in the first guide hole 23 of the main frame 20 in a moveable way, so when the first frame assembly 200 moves in the back and forth direction, a gap between the main frame 20 and the first frame 210 or distortion thereof may be prevented.

At least one second guide hole 215 may be formed in the first frame 210. When needed, multiple second guide holes 215 may be formed. For example, the second guide hole 215 may be respectively formed in the upper center, the lower left, and the lower right of the first frame 210. A second guide pin 413 of a second frame 410 to be described may be inserted in the second guide hole 215 in a moveable way.

Figure 6:
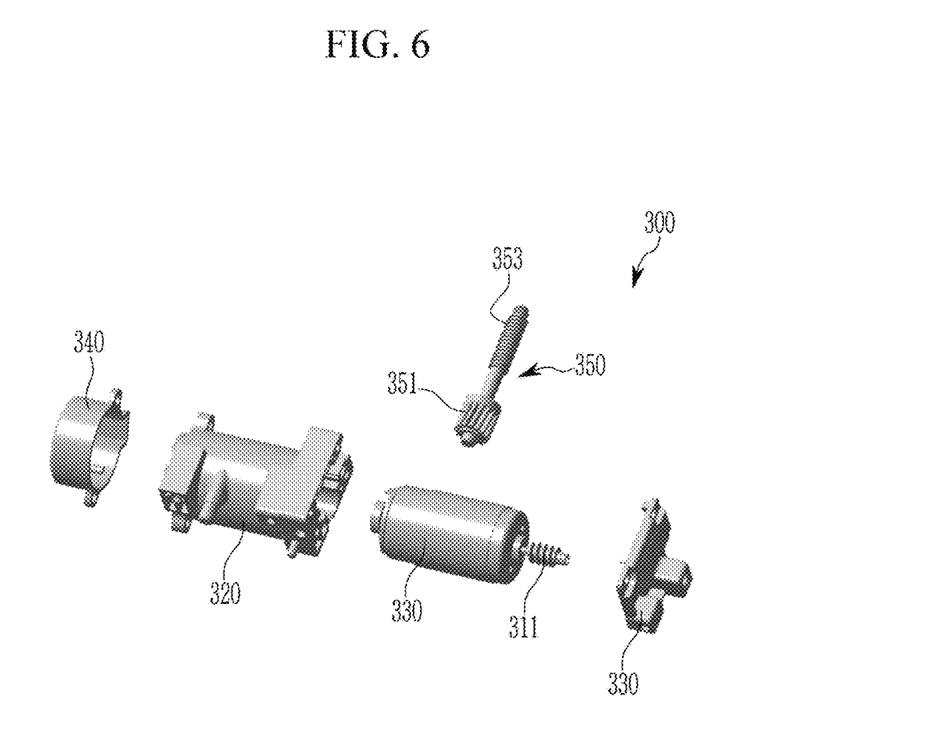
FIG. 6 shows an exploded perspective view of a configuration of a second motor assembly according to an exemplary embodiment of the present disclosure.

FIG. 6 shows an exploded perspective view of a configuration of a second motor assembly according to an exemplary embodiment of the present disclosure.

Referring to FIG. 6, the second motor assembly 300 may include a second motor 310, a second motor housing 320, a second motor front cover 330, a second motor rear cover 340, and a second rotation gear 350.

The second motor 310 may generate power by electrical energy, and a second worm gear 311 may be combined to a rotation shaft of the second motor 310.

A second worm wheel 351 may be formed at a first end of the second rotation gear 350, and a second lead screw 353 may be formed at a second end of the second rotation gear 350.

The second worm wheel 351 of the second rotation gear 350 may be gear-engaged to the second worm gear 311 combined to the rotation shaft of the second motor 310. The torque of the second motor 310 may be switched to the perpendicular direction by the second worm gear 311 and the second worm wheel 351. The second worm gear 311 may be gear-engaged to the second worm wheel 351 so the self-locking function in which the second frame 410 is not moved by the external force when the second motor 310 is not operated may be realized. The first lead screw 153 may be gear-engaged to the first nut plate 220 of the first frame 210 to be described.

The second motor 310 may be installed in the second motor housing 320, the second motor front cover 330 may be combined to a front side of the second motor 310, and the second motor rear cover 340 may be combined to a rear side of the second motor 310. While the second motor 310, the second motor housing 320, the second motor front cover 330, and the second motor rear cover 340 are combined, the second motor assembly 300 may be assembled in the second motor seating groove 211 of the first frame 210.

Figure 7:
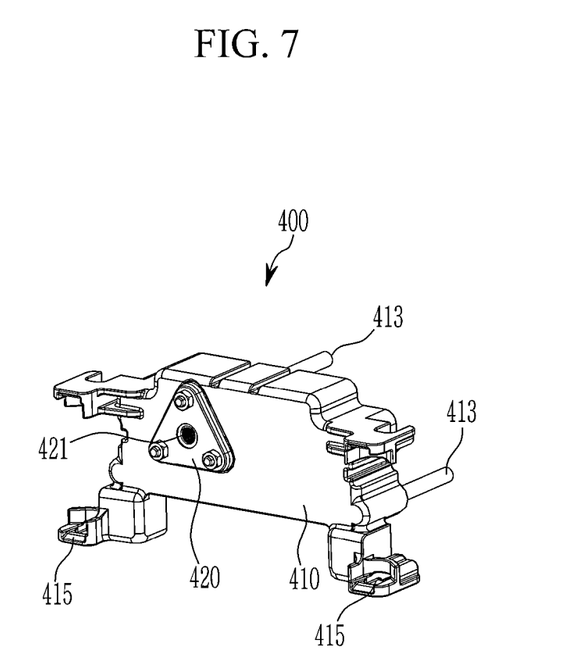
FIG. 7 shows a perspective view of a configuration of a second frame assembly according to an exemplary embodiment of the present disclosure.

FIG. 7 shows a perspective view of a configuration of a second frame assembly according to an exemplary embodiment of the present disclosure.

Referring to FIG. 7, the second frame assembly 400 may include a second frame 410, a second nut plate 420, and a second guide pin 413.

The second frame 410 may be mounted in the first frame 210 to be moveable in the back and forth direction.

The second nut plate 420 may convert a rotation motion generated by the second motor 310 of the second motor assembly 300 into a straight-line motion. For this purpose, a second nut groove 421 formed in the second nut plate 420 may be gear-engaged to the second lead screw 353 of the second rotation gear 350.

Hence, when the second motor 310 is operated, the torque generated on the second motor 310 may be switched to be perpendicular to the rotation shaft of the second motor 310 by the second worm gear 311 and the second worm wheel 351. The rotation motion of the second motor 310 may be switched to the straight-line motion by the second lead screw 353 and the second nut plate 420. The second frame assembly 400 accordingly may move in the back and forth direction by the operation of the second motor 310. When needed, the second nut plate 420 may be integrally formed with the second frame 410.

At least one second guide pin 413 may be formed in the second frame 410, and multiple second guide pins 413 may be formed if needed. The second guide pin 413 may extend in a direction that goes toward the first frame 210. The second guide pin 413 may be positioned on the position that corresponds to the second guide hole formed in the first frame 210. The second guide pin 413 of the second frame 410 may be inserted in the second guide hole of the first frame 210 in a moveable way, so when the second frame assembly 400 moves in the back and forth direction, the gap between the first frame 210 and the second frame 410 or the distortion thereof may be prevented.

A pair of first link seating portions 415 to which a link is assembled to be described may be formed on respective sides of the second frame 410.

Figure 8:
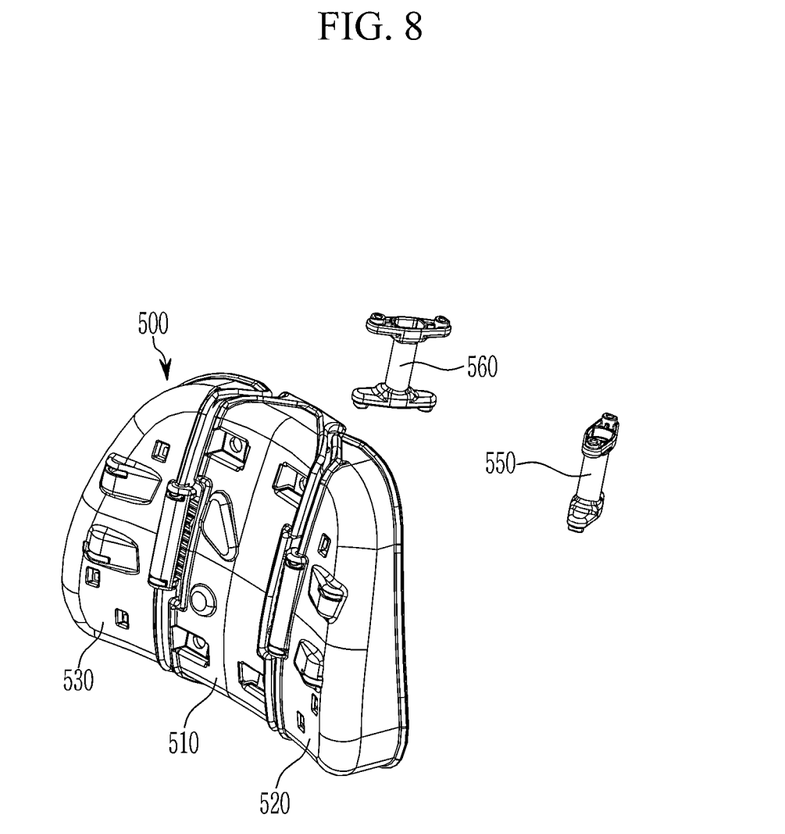
FIG. 8 and FIG. 9 show perspective views of a configuration of a wing-out frame according to an exemplary embodiment of the present disclosure.
Figure 9:
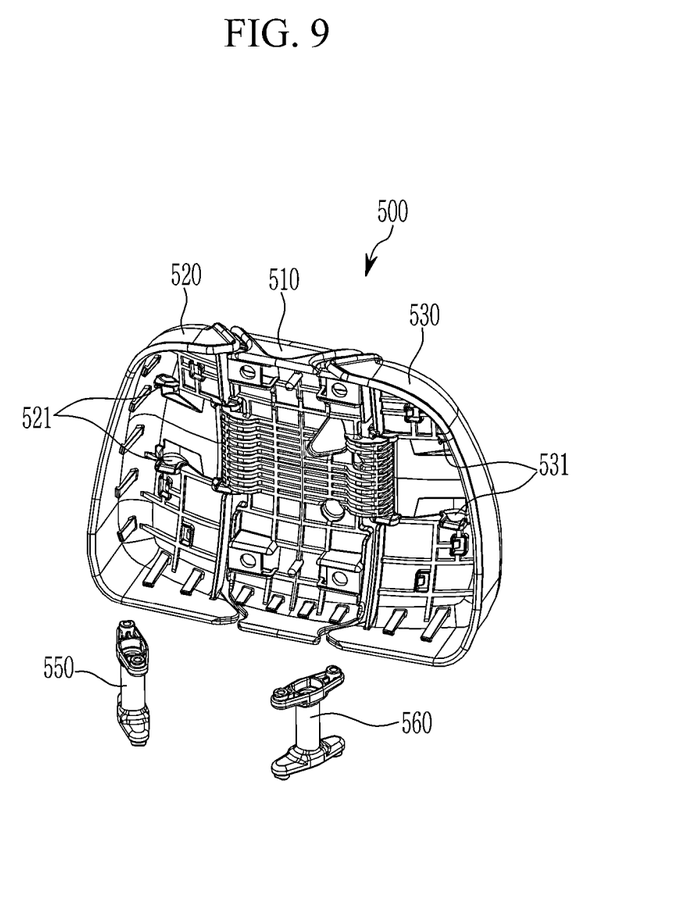

FIG. 8 and FIG. 9 show perspective views of a configuration of a wing-out frame according to an exemplary embodiment of the present disclosure.

Referring to FIG. 8 and FIG. 9, the wing-out frame 500 may include a center frame 510, and a pair of lateral frames mounted on respective sides of the center frame 510. The one pair of lateral frames may include a first lateral frame 520 and a second lateral frame 530.

The center frame 510 and the one pair of lateral frames may be hinge-combined, and the one pair of lateral frames may be rotated in an inward direction (or a direction in which the one pair of lateral frames face each other) of the center frame 510.

A second link seating portion 521 in which a link is assembled may be respectively formed in the first lateral frame 520 and the second lateral frame 530 of the wing-out frame 500.

The lateral frames 520 and 530 of the wing-out frame 500 may be connected to the second frame 410 of the second frame assembly 400 through links.

That is, the first lateral frame 520 may be connected to the second frame assembly 400 through a first link 550, and the second lateral frame 530 may be connected to the second frame assembly 400 through a second link 560.

First ends of the first link 550 and the second link 560 may be rotatably combined to the first link seating portion 415 formed in the second frame 410, and second ends of the first link 550 and the second link 560 may be rotatably assembled to second link seating portions 521 and 531 of the lateral frame. Therefore, when the second frame assembly 400 moves forward, the first lateral frame 520 and the second lateral frame 530 may be rotated in a direction in which they face each other. On the contrary, when the second frame assembly 400 moves backward, the first lateral frame 520 and the second lateral frame 530 may be rotated in a direction in which they become distant from each other.

An operation of a wing-out headrest according to an exemplary embodiment of the present disclosure will now be described with reference to drawings.

A sliding operation of a wing-out headrest according to an exemplary embodiment of the present disclosure will now be described.

Figure 10:
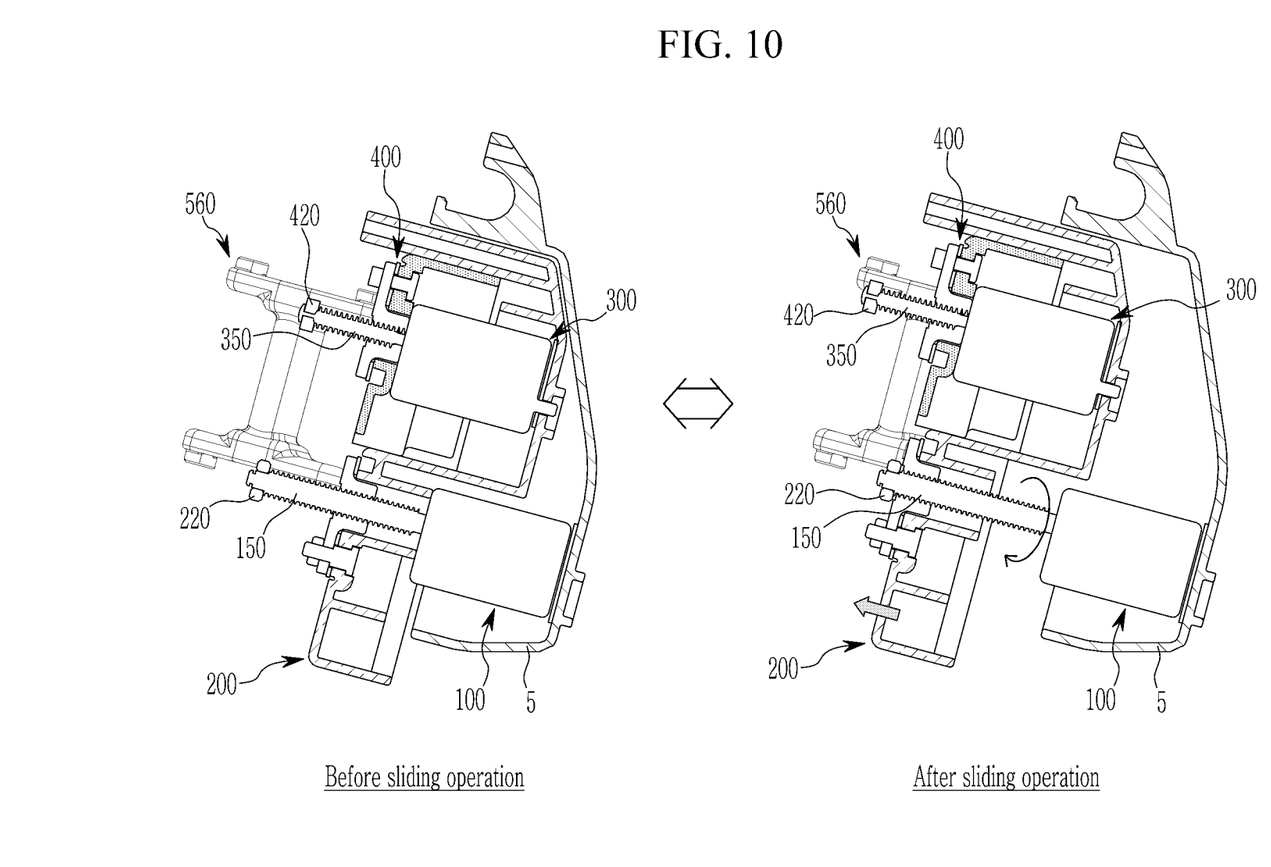
FIG. 10 and FIG. 11 show a sliding operation of a wing-out headrest according to an exemplary embodiment of the present disclosure.
Figure 11:
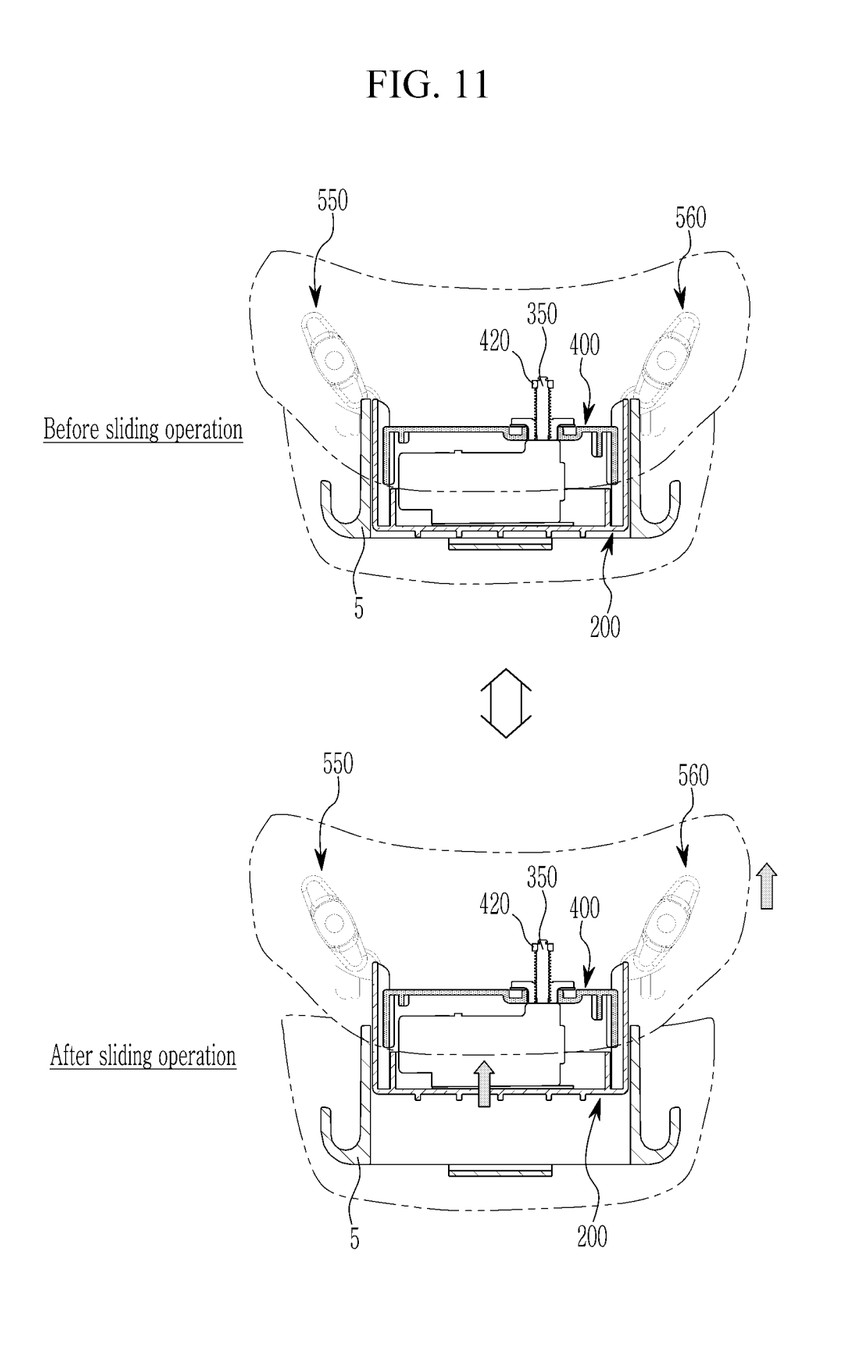

FIG. 10 and FIG. 11 show a sliding operation of a wing-out headrest according to an exemplary embodiment of the present disclosure.

Referring to FIG. 10 and FIG. 11, when the first motor 110 is operated, the first worm gear 111 combined to the rotation shaft of the first motor 110 may be rotated, and the first worm wheel 151 gear-engaged to the first worm gear 111 may be rotated. That is, the torque generated by the first motor 110 may be switched to a direction that is perpendicular to the rotation shaft of the first motor 110 by the first worm gear 111 and the first worm wheel 151.

As the first worm wheel 151 is rotated, the first lead screw 153 connected through the first rotation gear 150 may be rotated. The first frame 210 may slide to move forward by the first spindle nut of the first frame 210 gear-engaged to the first lead screw 153. That is, the rotation motion generated by the first motor 110 may be converted into the straight-line motion by the gear-engagement of the first lead screw 153 and the first nut plate 220.

When the first frame 210 moves forward, the second frame assembly 400 mounted in the first frame 210 may move forward, and as the second frame assembly 400 moves forward, the wing-out frame 500 may move forward. Accordingly, the sliding operation of the wing-out frame 500 is realized. That is, as the first frame assembly 200 moves, the second frame assembly 400 also moves. In other words, the first frame assembly 200 and the second frame assembly 400 may move together.

As the first worm gear 111 is gear-engaged to the first worm wheel 151, the self-locking function in which the wing-out frame 500 and the first frame 210 do not move when an external force is applied to the wing-out frame 500 is realized.

A process for the wing-out frame 500 to slide to move backward is a reverse to the process for the wing-out frame 500 to slide to move forward, so no detailed descriptions thereof will be provided.

A wing-out operation of the wing-out headrest according to an exemplary embodiment of the present disclosure will now be described.

Figure 12:
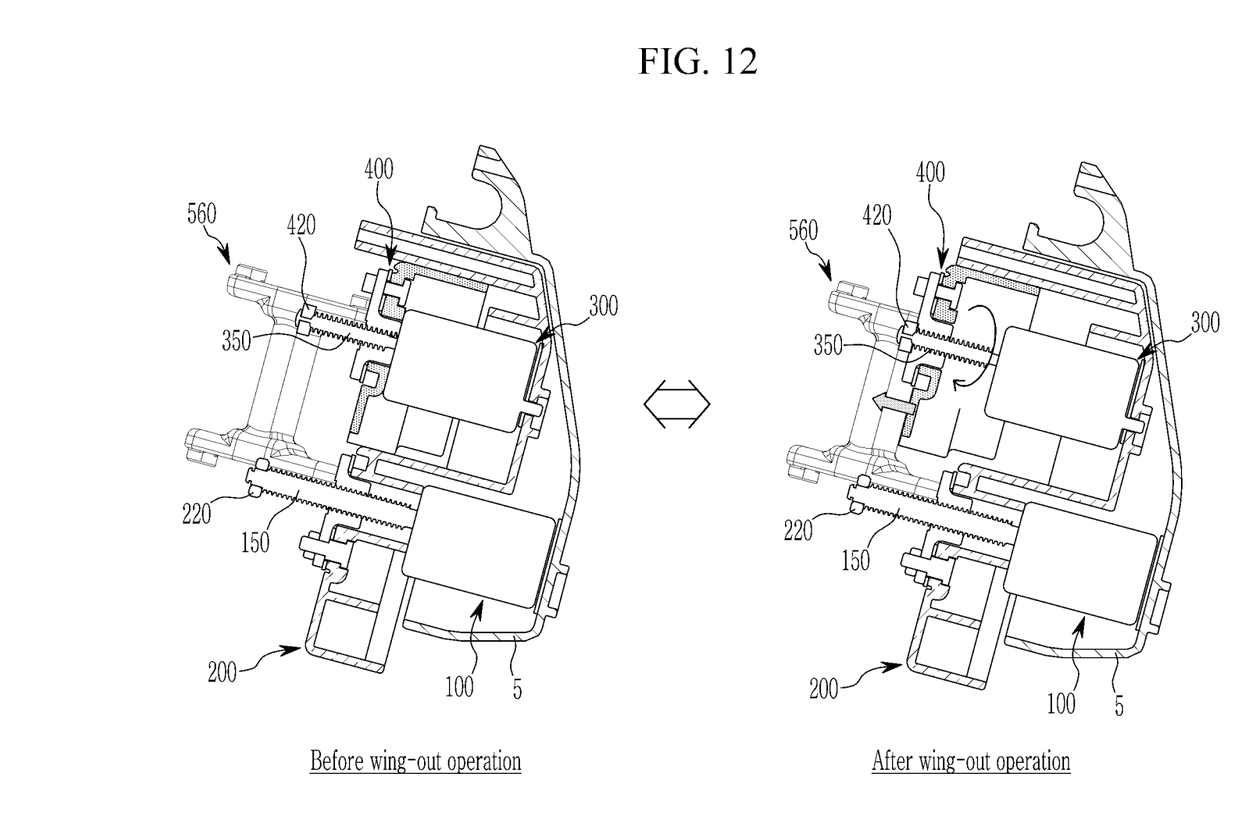
FIG. 12 and FIG. 13 show a wing-out operation of a wing-out headrest according to an exemplary embodiment of the present disclosure.
Figure 13:
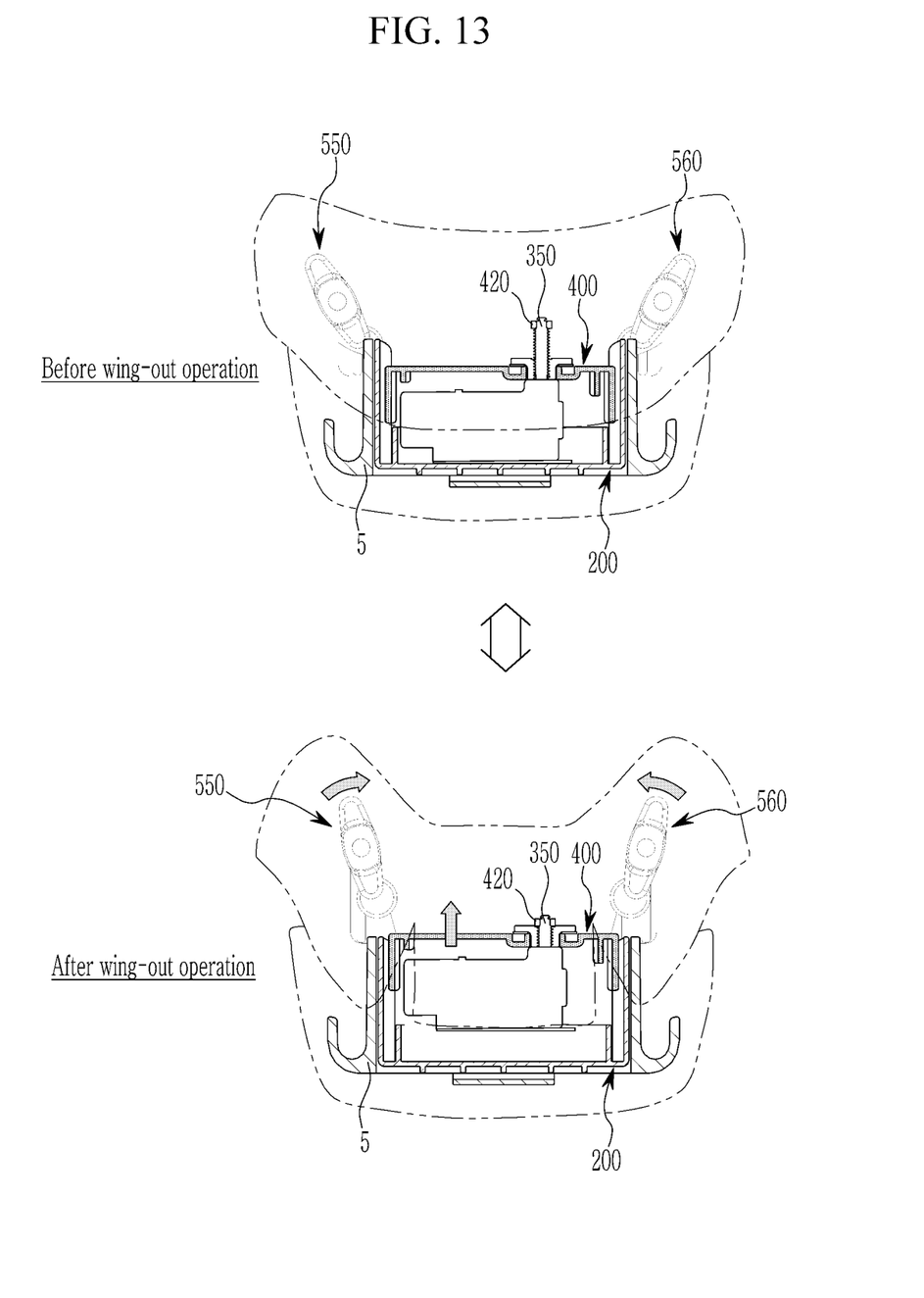

FIG. 12 and FIG. 13 show a wing-out operation of a wing-out headrest according to an exemplary embodiment of the present disclosure.

Referring to FIG. 12 and FIG. 13, when the second motor 310 is operated, the second worm gear 311 combined to the rotation shaft of the second motor 310 may be rotated, and the second worm wheel 351 gear-engaged to the second worm gear 311 may be then rotated. That is, the torque generated by the second motor 310 may be switched to a direction that is perpendicular to the rotation shaft of the second motor 310 by the second worm gear 311 and the second worm wheel 351.

As the second worm wheel 351 is rotated, the second lead screw 353 connected through the second rotation gear 350 may be rotated. The second frame 410 may slide to move forward by the second spindle nut of the second frame 410 gear-engaged to the second lead screw 353. That is, the rotation motion generated by the second motor 310 may be converted into the straight-line motion by the gear-engagement of the second lead screw 353 and the second nut plate 420.

When the second frame 410 moves forward, the first lateral frame 520 and the second lateral frame 530 of the wing-out frame 500 respectively connected to the second frame 410 through the link may be rotated in a direction in which they face each other. Hence, the wing-out operation of the wing-out frame 500 is realized.

In addition, as the second worm gear 311 is gear-engaged to the second worm wheel 351, the self-locking function in which the wing-out frame 500 and the second frame 410 may not move when an external force is applied to the wing-out frame 500 is realized.

A process for the lateral frames of the wing-out frame 500 to be rotated to become distant from each other may be a reverse to the process for the lateral frames of the wing-out frame 500 to be rotated to face each other so it will not be described.

The second frame assembly 400 may move for an entire section in which the first frame assembly 200, and the first and second lateral frames of the wing-out frame 500 may be rotated for an entire section in which the second frame assembly 400 moves.

According to the above-described wing-out headrest for a vehicle according to an exemplary embodiment of the present disclosure, the sliding operation of the wing-out frame 500 may be realized through the first frame assembly 200 that slides to move by the power of the first motor assembly 100. The rotation operation (or the wing-out operation) of the lateral frame of the wing-out frame 500 may be realized through the second frame assembly 400 that slides to move by the power of the second motor assembly 300.

Convenience of users may be increased by realizing the sliding operation and the wing-out operation of the wing-out frame 500 configuring the wing-out headrest in an electric way.

While this disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

DESCRIPTION OF SYMBOLS

1: headrest
10: stay
20: main frame
21: first motor seating groove
23: first guide hole
100: first motor assembly
110: first motor
111: first worm gear
120: first motor housing
130: first motor front cover
140: first motor rear cover
150: first rotation gear
151: first worm wheel
153: first lead screw
200: first frame assembly
210: first frame
211: second motor seating groove
213: first guide pin
220: first nut plate
221: first nut groove
300: second motor assembly
310: second motor
311: second worm gear
320: second motor housing
330: second motor front cover
340: second motor rear cover
350: second rotation gear
351: second worm wheel
353: second lead screw
400: second frame assembly
410: second frame
413: second guide pin
415: first link seating portion
420: second nut plate
500: wing-out frame
510: center frame
520: first lateral frame
521: second link seating portion
530: second lateral frame
550: first link
560: second link

What is claimed is:

1. A headrest for a vehicle, the headrest comprising:
a main frame mounted on a stay;
a first frame assembly mounted on the main frame and configured to reciprocate in a back and forth direction of the vehicle;
a second frame assembly mounted on the main frame and configured to reciprocate in the back and forth direction of the vehicle; and
a wing-out frame mounted on the second frame assembly, and including a center frame and a pair of first and second lateral frames rotatably mounted on respective sides of the center frame,
wherein the second frame assembly and the wing-out frame are configured to move back and forth as the first frame assembly moves,
wherein the first and second lateral frames of the wing-out frame are configured to rotate as the second frame assembly moves,
wherein the second frame assembly comprises:
a second frame mounted on the first frame in a moveable way;
a second nut plate converting a rotation motion of a second motor assembly mounted on the second frame and generating power into a straight-line motion, and installed in the second frame; and
at least one second guide pin formed in the second frame, and
wherein a second guide hole into which the second guide pin is moveably inserted is formed in the first frame assembly.

2. The headrest of claim 1, wherein the first frame assembly comprises:
a first frame mounted on the main frame in a moveable way;
a first nut plate for converting a rotation motion of a first motor assembly mounted on the main frame and generating power into a straight-line motion, and installed in the first frame; and
at least one first guide pin formed in the first frame.

3. The headrest of claim 2, wherein a first guide pin moveably inserted in the first guide hole is formed in the main frame.

4. The headrest of claim 2, wherein the first motor assembly comprises:
a first motor for generating power;
a first worm gear combined to a rotation shaft of the first motor; and a first rotation gear comprising a first end on which a first worm wheel gear-engaged to the first worm gear is formed and a second end on which a first lead screw is formed.

5. The headrest of claim 4, wherein the first lead screw of the first rotation gear is gear-engaged to a first nut groove formed on the first nut plate.

6. The headrest of claim 1, wherein the second motor assembly comprises:
a second motor for generating power;
a second worm gear combined to a rotation shaft of the second motor; and
a second rotation gear comprising a first end on which a second worm wheel gear-engaged to the second worm gear is formed and a second end on which a second lead screw is formed.

7. The headrest of claim 6, wherein the second lead screw of the second rotation gear is gear-engaged to a second nut groove formed on the second nut plate.

8. The headrest of claim 1, wherein first and second links are rotatably connected between the second frame and the first lateral frame and between the second frame and the second lateral frame.

9. The headrest of claim 8, wherein the first and second lateral frames are hinge-combined to the center frame so that they are rotated in a direction in which they face each other.

10. The headrest of claim 1, wherein
the second frame assembly moves for an entire section in which the first frame assembly moves, and
first and second lateral frames of the wing-out frame are rotated for an entire section in which the second frame assembly moves.

11. A vehicle that comprises a headrest of claim 1.

12. A headrest for a vehicle, the headrest comprising:
a main frame mounted on a stay;
a first frame assembly mounted on the main frame and configured to reciprocate in a back and forth direction of the vehicle;
a second frame assembly mounted on the main frame and configured to reciprocate in the back and forth direction of the vehicle; and
a wing-out frame mounted on the second frame assembly, and including a center frame and a pair of first and second lateral frames rotatably mounted on respective sides of the center frame,
wherein the second frame assembly and the wing-out frame are configured to move back and forth as the first frame assembly moves,
wherein the first and second lateral frames of the wing-out frame are configured to rotate as the second frame assembly moves,
wherein the second frame assembly comprises:
a second frame mounted on the first frame in a moveable way;
a second nut plate converting a rotation motion of a second motor assembly mounted on the second frame and generating power into a straight-line motion, and installed in the second frame; and
at least one second guide pin formed in the second frame,
wherein first and second links are rotatably connected between the second frame and the first lateral frame and between the second frame and the second lateral frame,
wherein when the second frame assembly moves forward, the first lateral frame and the second lateral frame are rotated in a direction in which they face each other by the first and second links, and
wherein when the second frame assembly moves backward, the first lateral frame and the second lateral frame are rotated in a direction in which they become distant from each other by the first and second links.

* * * * *